US006329972B1

(12) United States Patent
Yoo

(10) Patent No.: US 6,329,972 B1
(45) Date of Patent: Dec. 11, 2001

(54) METHOD FOR DRIVING ANTIFERROELECTRIC LIQUID CRYSTAL DISPLAY

(75) Inventor: Jeong-Geun Yoo, Kyonggi-do (KR)

(73) Assignee: SamSung SDI Co., Ltd., Kyungki-do (KR)

( * ) Notice: Subject to any disclaimer, the term of this patent is extended or adjusted under 35 U.S.C. 154(b) by 0 days.

(21) Appl. No.: 09/292,517

(22) Filed: Apr. 15, 1999

(30) Foreign Application Priority Data

Jun. 9, 1998 (KR) .............................................. 98-21236

(51) Int. Cl.[7] .......................... G09G 3/36; G02F 1/1337; G02F 1/141

(52) U.S. Cl. ............................ 345/97; 349/129; 349/134

(58) Field of Search .............................. 345/97, 94, 208, 345/204; 349/134, 128, 129, 133

(56) References Cited

U.S. PATENT DOCUMENTS 5,408,246 * 4/1995 Kondoh ............................... 345/100
5,459,481 * 10/1995 Tanaka et al. ......................... 345/95
5,623,351 * 4/1997 Kondoh ............................... 349/100
5,631,752 * 5/1997 Tanaka ................................ 349/173
5,777,593 * 7/1998 Kondoh ................................. 345/97
5,781,267 * 7/1998 Takimoto et al. ................... 349/174
5,838,293 * 11/1998 Kondoh ................................. 345/97
5,886,755 * 3/1999 Imoto et al. .......................... 349/37
5,895,108 * 4/1999 Tanaka ................................ 349/173
5,973,659 * 10/1999 Kondoh ................................. 345/97
6,008,787 * 12/1999 Kondoh ................................. 345/97
6,016,133 * 1/2000 Nito et al. ............................. 345/89
6,052,103 * 4/2000 Fujiwara et al. ....................... 345/89
6,133,896 * 10/2000 Suzuki .................................. 345/97
6,139,927 * 10/2000 Takao et al. ......................... 349/128
6,151,090 * 11/2000 Tanaka et al. ....................... 349/134
6,151,096 * 11/2000 McDonnell et al. ................. 349/188
6,163,311 * 10/2000 Funfschilling et al. ............... 345/97
6,175,401 * 1/2001 Tanaka et al. ....................... 349/172
6,191,771 * 2/2001 Kondoh ............................... 345/100

* cited by examiner

*Primary Examiner*—Steven Saras
*Assistant Examiner*—Alecia D. Nelson
(74) *Attorney, Agent, or Firm*—Robert E. Bushnell, Esq.

(57) ABSTRACT

A method for driving an antiferroelectric liquid crystal display includes the steps of causing antiferroelectric liquid crystal molecules to undergo a phase-transition into only one of positive and negative ferroelectric phases, and causing the antiferroelectric liquid crystal molecules to undergo a phase-transition into an antiferroelectric phase. The step of causing liquid crystal molecules to undergo a phase-transition into only one of positive and negative ferroelectric phases is realized by applying a selection voltage to the liquid crystal molecules. The step of causing the antiferroelectric liquid crystal molecules to undergo a phase-transition into an antiferroeletric phase is realized by applying a direct compensating voltage to the antiferroelectric liquid crystal molecules.

8 Claims, 4 Drawing Sheets

METHOD FOR DRIVING ANTIFERROELECTRIC LIQUID CRYSTAL DISPLAY

BACKGROUND OF THE INVENTION

1. Field of the Invention

The present invention relates to a drive method of a liquid crystal display and, more particularly, to a method for driving an antiferroelectric liquid crystal display.

2. Description of Related Art

Generally, in a conventional antiferroelectric liquid crystal display, a white mode is realized when liquid crystal molecules undergo a phase-transition into one of a positive ferroelectric phase (hereinafter, referred to as "F+phase") by positive voltage and a negative ferroelectric phase (hereinafter, referred to as "F−phase") by negative voltage, while a black mode is realized when the liquid crystal molecules undergo a phase-transition into an antiferroeletric phase (hereinafter, referred to as "AF phase") when no voltage is applied.

Describing more in detail, to realize the white mode, the liquid crystal molecules alternately undergo a phase-transition into the F+phase and the F−phase by one frame cycle, and the time for one frame cycle is set at less than 30 ms, at which the frame is invisible, to prevent the flicker of images.

However, in the above described antiferroelectric liquid crystal display, if a viewing angle is inclined from a direction normal to an activated pixel on a screen, since directions of the F−phase and the F+phase are different from each other as shown in FIG. 1, light transmittance with respect to the viewing angle becomes different, causing flicker of images on he screen.

To prevent flicker, the time for two frame cycles for repeating the +phase and the F−phase should be set at less than 30 ms. That is, one frame cycle should take less than 15 ms.

However, since present technology cannot increase a drive frequency of a drive device of the liquid crystal display above tens of MHz, it is impossible to realize a high color moving picture. Therefore, it is very costly and time-consuming to develop a drive device that can realize 15 ms frame cycle.

Therefore, the conventional antiferroelectric liquid crystal display displaying an image using the F+phase and the F−phase cannot solve the flicker problem unless the frame cycle is reduced to less than 15 ms.

SUMMARY OF THE INVENTION

Therefore, the present invention has been made in an effort to solve the above-described problems.

It is an objective of the present invention to provide a method for driving an antiferroelectric liquid crystal display in which a display quality can be improved by preventing a flicker effect at all viewing angles without reducing frame cycle times.

To achieve the above objective, the present invention provides a method for driving an antiferroelectric liquid crystal display, comprising the steps of causing antiferroelectric liquid crystal molecules to undergo a phase-transition into only one of positive and negative ferroelectric phases, and causing the antiferroelectric liquid crystal molecules to undergo a phase-transition into an antiferroelectric phase.

Preferably, the step of causing the antiferroelectric liquid crystal molecules to undergo a phase-transition into only one of positive and negative ferroelectric phases comprises the steps of applying a selection voltage, which is higher than a threshold selection voltage by which the liquid crystal molecules undergo the phase-transion into one of the positive and negative ferroelectric phases, to the antiferroelectric liquid crystal molecules and applying a sustain voltage to the liquid crystal molecules to sustain the phase-transition state of the molecules into one of the positive and negative ferroelectric phases.

Preferably, the step of causing the antiferroelectric liquid crystal molecules to undergo a phase-transition into the antiferroeletric phase comprises the step of applying a direct compensating voltage to the antiferroelectric liquid crystal molecules, the direct compensating voltage having a potential opposite to the threshold selection voltage and the sustain voltage, and an absolute value lower than that of the threshold selection voltage.

A total value of the selection voltage, the sustain voltage, and the direct compensating voltage in a unit frame becomes zero.

The absolute value of the threshold selection voltage is higher than that of a threshold non-selection voltage by which the liquid crystal molecules undergo the phase-transition into the antiferroelectric phase.

An effective absolute value of the direct compensating voltage in a unit frame is equal to the sum of an effective absolute value of the selection voltage and an effective absolute value of the sustain voltage.

The selection voltage has a positive and negative level. And a negative level selection voltage initially applied in the unit frame may be omitted.

An absolute value of the sustain voltage is lower than that of the threshold selection voltage but higher than that of a threshold non-selection voltage by which the liquid crystal molecules undergo the phase-transition into the antiferroelectric phase.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF PREFERRED EMBODIMENTS

Reference will now be made in detail to the present preferred embodiment of the invention, an example of which is illustrated in the accompanying drawings. Wherever possible, the same reference numbers will be used throughout the drawings to refer to the same or like parts.

Figure 1:
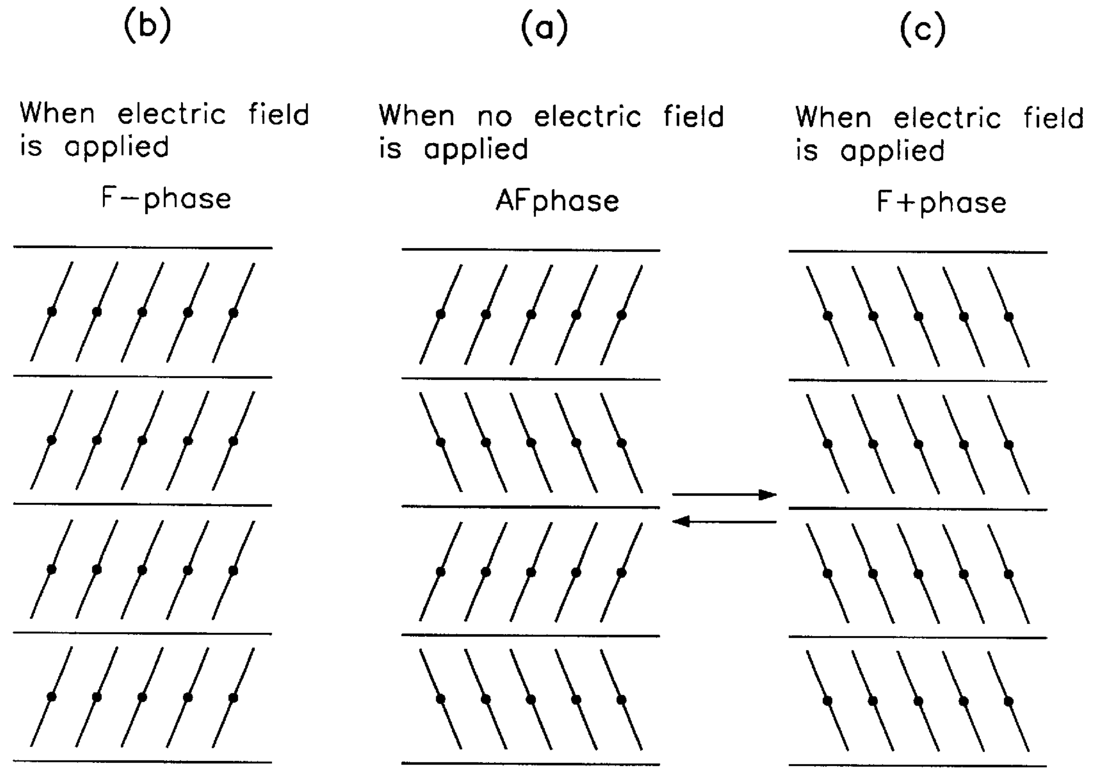
FIGS. 1*a*, 1*b* and 1*c* are schematic views illustrating molecules'phase of antiferroelectric liquid crystal.

FIG. 1 shows phases of antiferroelectric liquid crystal molecules related to the present invention. The antiferroelectric liquid crystal molecules used in the present invention are antiferroelectric smetic liquid crystal molecules which are disposed in a multi-layer structure and undergo a phase-transition into a spiral-structure in which each longitudinal axis of liquid crystal molecules is inclined with respect to each layer surface.

For example, liquid crystal molecules are disposed within a liquid crystal cell having a gap less than a spiral pitch. Therefore, if the spiral states of the molecules are released, the liquid crystal molecules undergo a phase-transition into an AF phase in which dipoles are compensated at each layer when no electric field is applied (see FIG. 1*a*).

In this state, when the electric field is applied, dipoles are aligned according to a direction where the electric field is applied in the F+phase or the F−phase. That is, as the liquid crystal molecules are varied between the AF phase, F+phase, and F−phase, the liquid crystal display realizes the lightness and darkness.

Figure 2:
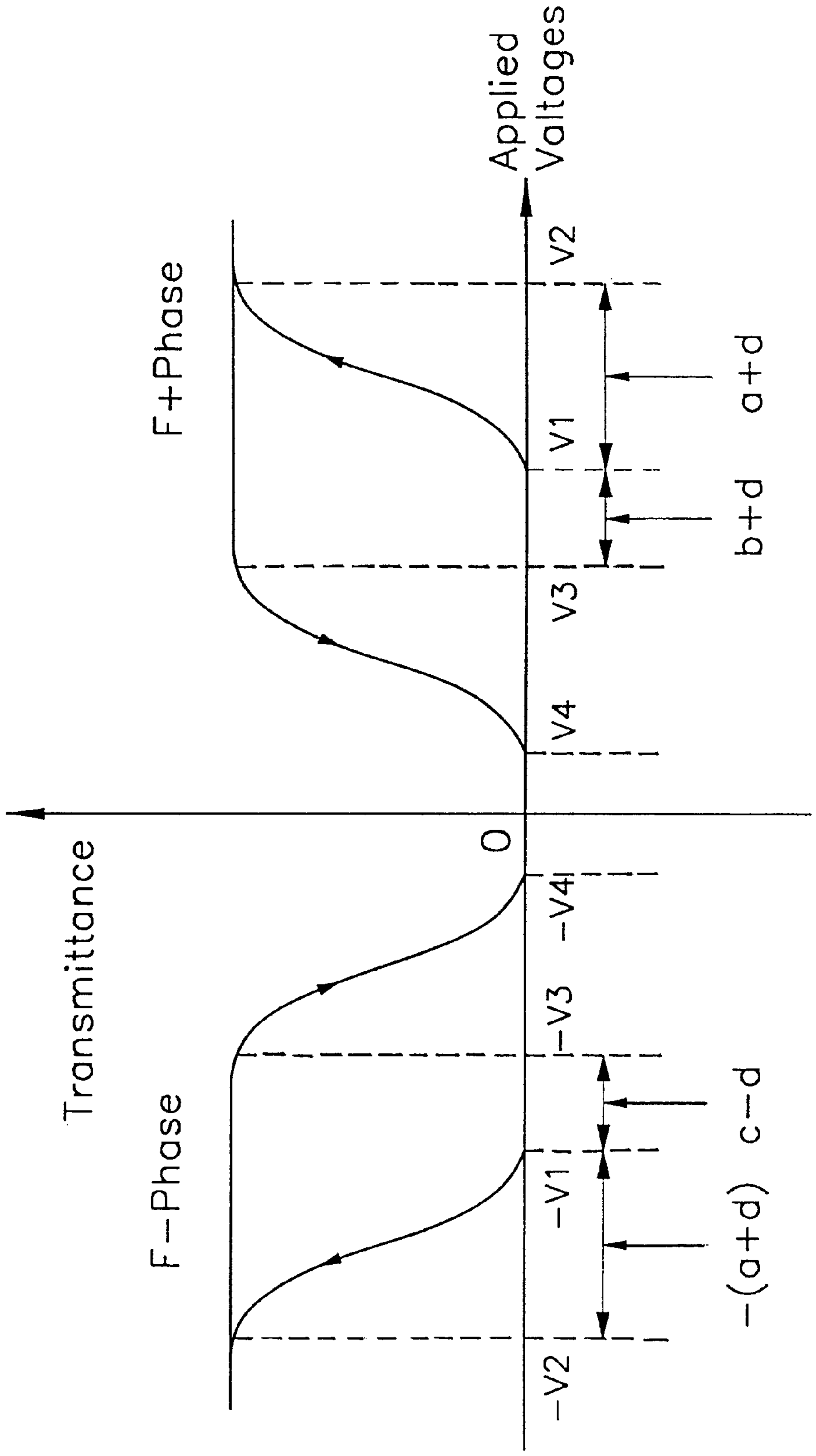
FIG. 2 is a graph illustrating transmittance of antiferroelectric liquid crystal according to voltages applied.

Applied voltages for varying the transmittance depending on the above three phases can be presented in a hysteresis curve as shown in FIG. 2. That is, antiferroelectric liquid crystal molecules have a hysteresis characteristic where an absolute value of a threshold selection voltage V1 for phase-transition of the liquid crystal molecules from the AF phase to F+phase or F−phase is higher than that of a threshold non-selection voltage V3 for phase-transition of the liquid crystal molecules from the F+phase or F−phase to the AF phase.

In the hysteresis characteristic, the F+phase appears in a positive voltage section higher than the threshold section voltage V1 as the voltage is increasing and in a positive voltage section higher than the threshold non-selection voltage V3 as the voltage is decreasing. In addition, the F−phase appears in a negative voltage section lower than the threshold section voltage −V1 as the voltage is decreasing and in a negative voltage section lower than the threshold non-selection voltage −V3 as the voltage is increasing.

In the present invention, the liquid crystal display is driven using only one of the F+ and F−phases. Therefore, the liquid crystal display of the present invention displays an image by the AF phase and one of the F+ and F−phases.

Figure 3:
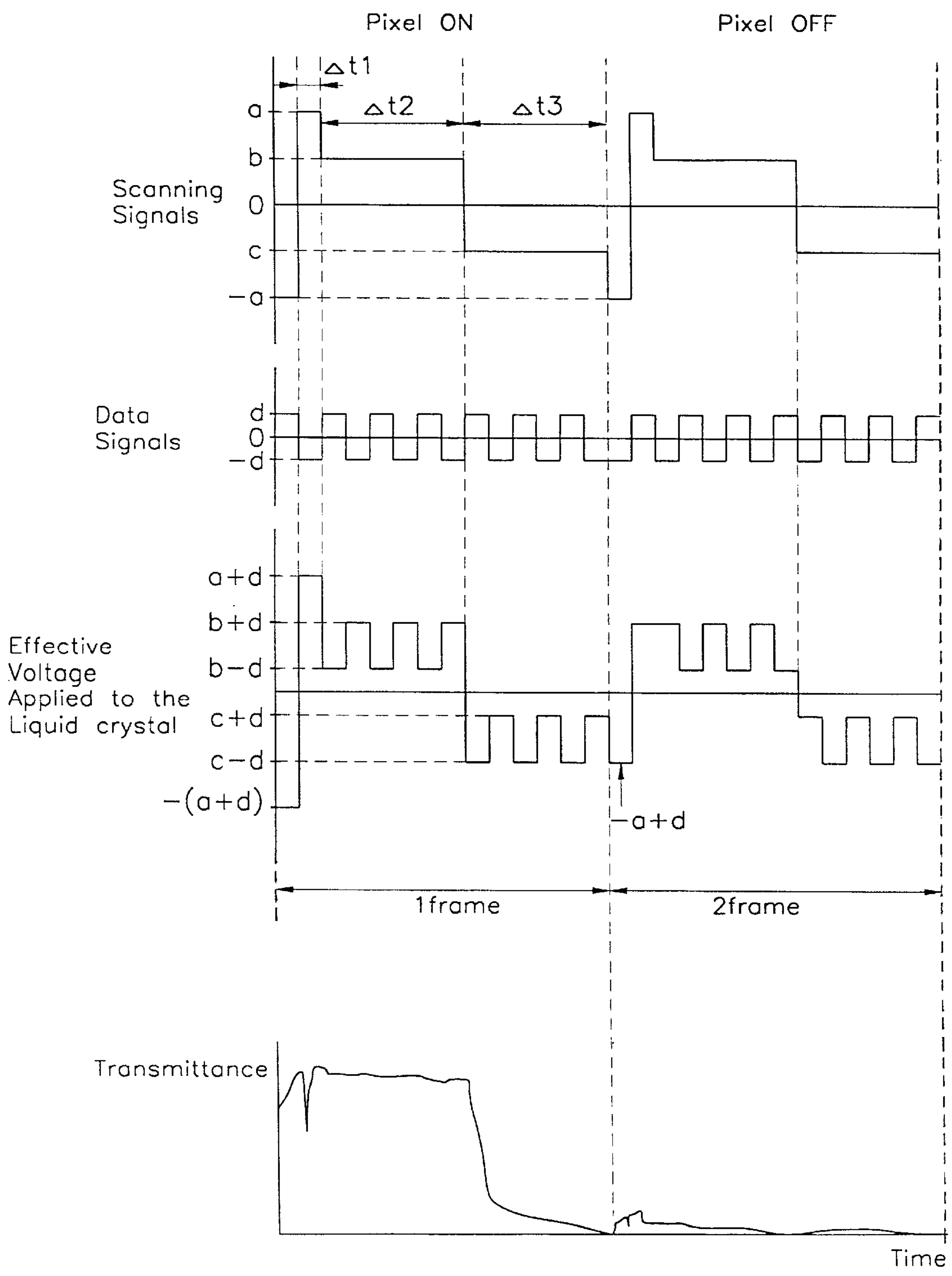
FIG. 3 is a drive signal according to a preferred embodiment of the present invention.

FIG. 3 shows a drive signal wave according to an embodiment of the present invention. Scanning signals applied to the antiferroelectric liquid crystal are identical in first and second frames. Data signals are synchronized with the scan signals. An effective voltage applied to the antiferroelectric liquid crystal is formed by the combination of the scan and data signals.

To realize white and black modes, a waveform of the data signal in the first frame is reversed in the second frame. At this point, since the data signal is applied as a square wave in which absolute values (d) and (−d) are identical, an accumulated direct voltage value of the data signal becomes zero.

In addition, among the scan signal voltages, a voltage (a) applied for the time Δt1 is an selection voltage for realizing the F+phase, a voltage (b) applied for the time Δt2 is a sustain voltage for sustaining the F+phase, and a voltage (c) applied for the time Δt3 is a direct compensating voltage having the same absolute value as the sustain voltage.

That is, the absolute value |Δt3 ×c | of the direct compensating voltage is the same as the absolute value of |Δt2 ×b | of the sustain voltage.

As shown in FIG. 3, a negative level selection voltage (−a) initially applied during a frame functions as the direct compensating voltage. However, this voltage may be omitted if an accumulated voltage (a) applied for Δt1 is compensated by the direct compensating voltage applied for Δt3.

As described above, since there is a section for applying the direct compensating voltage in the scan signal, an accumulated direct voltage of the scan signal is zero. As a result, an accumulated direct voltage applied to the liquid crystal becomes zero by difference in potential between the scan signal and the data signal. Therefore, "DC free" for protecting the liquid crystal can be realized.

The operation of the antiferroelectric liquid crystal according to the above described driving method will be described more in detail with reference to FIGS. 2 and 3.

When a voltage applied to the liquid crystal is selected within a range (a+d) in the positive section higher than the threshold selection voltage V1 as shown in FIG. 2, tilt angles of liquid crystal molecules are varied to transit to the F+phase. That is, the antiferroelectric liquid crystal is oriented to the F+phase by the selection voltage applied for Δt1.

Once the liquid crystal molecules undergo a phase-transition to the F+phase, even when the voltage applied to the liquid crystal is reduced to a section (b+d) between the threshold selection voltage V1 and the threshold non-selection voltage V3, the liquid crystal molecules are sustained in the F+phase by the above described hysteresis characteristic. That is, the liquid crystal molecules are sustained in the F+phase by the sustain voltage applied for Δt2.

As described above, when the sustain voltage being applied to the liquid crystal is replaced with the negative direct compensating voltage (c−d) between the negative threshold selection voltage −V1 and the negative threshold non-selection voltage −V3, the liquid crystal molecules undergo a phase-transition into the AF phase, thereby realizing the direct compensation within a unit frame. Therefore, the F−phase does not appear during the first frame while the F+phase and AF phase appear, realizing the white mode.

At this point, it is preferable to prolong the cycle of Δt2 for sustaining the F+phase within a range where an absolute value of the direct compensating voltage applied for Δt3 is less than an absolute value of the negative threshold selection voltage −V1. The prolongation of the cycle of Δt2 improves the display quality as the time for sustaining the F+phase is extended.

In the second frame, as the phase of the data signal is reversed, an effective voltage applied to the liquid crystal is in a section (b+d) between the threshold selection voltage V1 and the threshold non-selection voltage V3 in the positive level, and in a section (c−d) between the threshold selection voltage −V1 and the threshold non-selection voltage −V3 in the negative level. Accordingly, only the AF phase appears during the second frame, thereby realizing the black mode.

Figure 4:
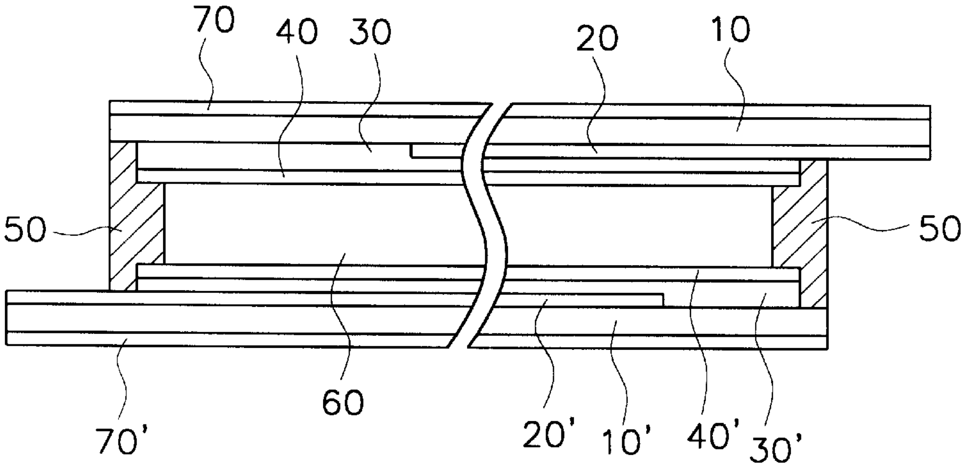
FIG. 4 is a sectional view of a liquid crystal display which can be driven by a drive method of a preferred embodiment of the present invention.

FIG. 4 shows an antiferroelectric liquid crystal display which can be operated by a drive method according to a preferred embodiment of the present invention.

The reference numerals 10 and 10', 20 and 20', 30 and 30', 40 and 40', 50, 60, and 70 and 70' respectively denote upper and lower insulating substrates, upper and lower conductive layers, upper and lower insulating layers, orientation layers, a sealing material, an antiferroelectric liquid crystal molecules, and upper and lower polarizers.

As the structure of the liquid crystal display shown in FIG. 4 is well known, the detailed description thereof will be omitted herein.

Figure 5:
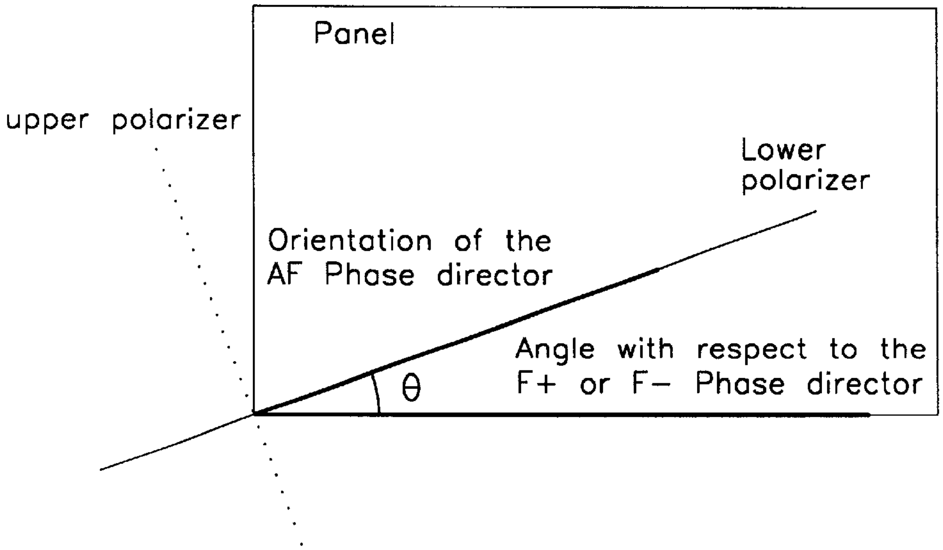
FIG. 5 is a view illustrating relative positions between polarizing directions of polarizers and phases of liquid crystal molecules.

The upper and lower polarizers 70 and 70' respectively attached on the insulating substrates 10 are disposed such that dipoles of the liquid crystal molecules undergo a phase-transition into the F+phase. That is, as shown in FIG. 5, the upper polarizer 70 is disposed such that a polarizing direction thereof is identical to an orientation of the AF phase, while the lower polarizer 70' is disposed such that a polarizing direction thereof has a predetermined angle with respect to the F+or F−phase.

Accordingly, in the liquid crystal display according to the present invention, when viewing angle is not directly in front of screen of the display, since only one of the F+phase and the AF phase appears, the flicker phenomenon can be prevented.

What is claimed is:

1. A method for driving an antiferroelectric liquid crystal display, comprising the steps of:

causing antiferroelectric liquid crystal molecules to undergo a phase-transition into only one of positive and negative ferroelectric phases; and causing the antiferroelectric liquid crystal molecules to undergo a phase-transition into an antiferroelectric phase.

2. The method of claim 1 wherein the step of causing the antiferroelectric liquid crystal molecules to undergo a phase-transition into only one of positive and negative ferroelectric phases comprises the steps of applying a selection voltage, which is higher than a threshold selection voltage by which the liquid crystal molecules undergo the phase-transition into one of the positive and negative ferroelectric phases, to the antiferroelectric liquid crystal molecules and applying a sustain voltage to the liquid crystal molecules to sustain the phase-transition state of the molecules into one of the positive and negative ferroelectric phases.

3. The method of claim 2 wherein the step of causing the antiferroelectric liquid crystal molecules to undergo a phase-transition into the antiferroeletric phase comprises the step of applying a direct compensating voltage to the antiferroelectric liquid crystal molecules, the direct compensating voltage having a potential opposite to the sustain voltage and an absolute value lower than that of the threshold selection voltage.

4. The method of claim 3 wherein a total value of the selection voltage, the sustain voltage, and the direct compensating voltage in a unit frame becomes zero.

5. The method of claim 2 wherein the absolute value of the threshold selection voltage is higher than that of a threshold non-selection voltage by which the liquid crystal molecules undergo the phase-transition into the antiferroelectric phase.

6. The method of claim 3 wherein an effective absolute value of the direct compensating voltage in a unit frame is equal to the sum of an effective absolute value of the selection voltage and an effective absolute value of the sustain voltage.

7. The method of claim 6 wherein a negative level selection voltage initially applied in the unit frame is omitted.

8. The method of claim 7 wherein an absolute value of the sustain voltage is lower than that of the threshold selection voltage but higher than that of a threshold non-selection voltage by which the liquid crystal molecules undergo the phase-transition into the antiferroelectric phase.

* * * * *